US009069610B2

(12) United States Patent
Chakravorty et al.

(10) Patent No.: US 9,069,610 B2
(45) Date of Patent: Jun. 30, 2015

(54) COMPUTE CLUSTER WITH BALANCED RESOURCES

(75) Inventors: Sayantan Chakravorty, Redmond, WA (US); Joshua B. Barnard, Seattle, WA (US); Colin Watson, Kirkland, WA (US); Gregory Burgess, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 590 days.

(21) Appl. No.: 12/903,456

(22) Filed: Oct. 13, 2010

(65) Prior Publication Data

US 2012/0096468 A1     Apr. 19, 2012

(51) Int. Cl.
G06F 9/46     (2006.01)
G06F 9/50     (2006.01)

(52) U.S. Cl.
CPC ............ *G06F 9/50* (2013.01); *G06F 2209/504* (2013.01); *Y02B 60/142* (2013.01)

(58) Field of Classification Search
None
See application file for complete search history.

(56) References Cited

U.S. PATENT DOCUMENTS

| 4,414,624 | A |   | 11/1983 | Summer et al. |
| 5,031,089 | A |   | 7/1991  | Liu et al. |
| 5,325,526 | A |   | 6/1994  | Cameron et al. |
| 5,437,032 | A | * | 7/1995  | Wolf et al. ..................... 718/103 |
| 5,619,695 | A |   | 4/1997  | Arbabi et al. |
| 6,341,303 | B1 |   | 1/2002  | Rhee et al. |
| 6,366,945 | B1 |   | 4/2002  | Fong et al. |
| 6,678,065 | B1 | * | 1/2004  | Hikawa ........................ 358/1.13 |
| 6,782,535 | B1 | * | 8/2004  | Dal-Santo et al. ............ 718/102 |
| 6,928,646 | B1 |   | 8/2005  | James et al. |
| 6,947,987 | B2 | * | 9/2005  | Boland ......................... 709/226 |
| 7,039,915 | B2 |   | 5/2006  | Kavoori et al. |
| 7,093,250 | B1 | * | 8/2006  | Rector ........................ 718/100 |
| 7,096,469 | B1 | * | 8/2006  | Kubala et al. ................ 718/100 |

(Continued)

FOREIGN PATENT DOCUMENTS

| CN | 1636191 A | 6/2010 |
| JP | H07141305 A | 2/1995 |
| JP | 2003330734 A | 11/2003 |

OTHER PUBLICATIONS

Ajay Gulati et al. "RePAIR: Reservation-Based Proportionate Allocation for I/O Resources", May 14, 2008; VMware Inc, HP Labs, Rice University; (Gulati_2008.pdf; pp. 1-20).*

(Continued)

*Primary Examiner* — Emerson Puente
*Assistant Examiner* — Hiren Patel
(74) *Attorney, Agent, or Firm* — Henry Gabryjelski; Kate Drakos; Micky Minhas

(57) ABSTRACT

A scheduler for a compute cluster that allocates computing resources to jobs to achieve a balanced distribution. The balanced distribution maximizes the number of executing jobs to provide fast response times for all jobs by, to the extent possible, assigning a designated minimum for each job. If necessary to achieve this minimum distribution, resources in excess of a minimum previously allocated to a job may be de-allocated, if those resources can be used to meet the minimum requirements of other jobs. Resources above those used to meet the minimum requirements of executing jobs are allocated based on a computed desired allocation, which may be developed based on respective job priorities. To meet the desired allocation, resources may be de-allocated from jobs having more than their desired allocation and re-allocated to jobs having less than their desired allocation of resources.

20 Claims, 9 Drawing Sheets

(56) References Cited

U.S. PATENT DOCUMENTS

| | | | |
|---|---|---|---|
| 7,685,226 B1 | 3/2010 | Norton et al. | |
| 7,756,989 B2* | 7/2010 | Goldszmidt et al. | 709/229 |
| 7,984,447 B1* | 7/2011 | Markov | 718/103 |
| 8,627,328 B2* | 1/2014 | Mousseau et al. | 718/104 |
| 8,954,584 B1* | 2/2015 | Subbarayan et al. | 709/226 |
| 2001/0034752 A1 | 10/2001 | Kremien | |
| 2002/0002578 A1 | 1/2002 | Yamashita | |
| 2002/0133530 A1* | 9/2002 | Koning | 709/102 |
| 2003/0154233 A1 | 8/2003 | Patterson | |
| 2003/0158884 A1 | 8/2003 | Alford, Jr. | |
| 2003/0233391 A1* | 12/2003 | Crawford et al. | 709/104 |
| 2004/0194089 A1* | 9/2004 | McCarthy et al. | 718/100 |
| 2004/0268349 A1* | 12/2004 | Ramakrishnan et al. | 718/100 |
| 2005/0010608 A1 | 1/2005 | Horikawa | |
| 2005/0028160 A1* | 2/2005 | Cofer et al. | 718/100 |
| 2005/0071842 A1 | 3/2005 | Shastry | |
| 2005/0154789 A1* | 7/2005 | Fellenstein et al. | 709/223 |
| 2005/0237930 A1 | 10/2005 | Patt-Shamir et al. | |
| 2005/0283782 A1* | 12/2005 | Lu et al. | 718/100 |
| 2006/0048157 A1 | 3/2006 | Dawson et al. | |
| 2006/0089922 A1 | 4/2006 | Flores et al. | |
| 2006/0190943 A1 | 8/2006 | Haeri | |
| 2006/0236368 A1* | 10/2006 | Raja et al. | 726/1 |
| 2007/0016907 A1 | 1/2007 | Benedetti et al. | |
| 2007/0039001 A1* | 2/2007 | Briccarello et al. | 718/102 |
| 2007/0067776 A1* | 3/2007 | McCarthy et al. | 718/104 |
| 2007/0106994 A1 | 5/2007 | Jackson | |
| 2007/0143765 A1 | 6/2007 | Aridor et al. | |
| 2007/0180451 A1 | 8/2007 | Ryan | |
| 2007/0266388 A1 | 11/2007 | Jackson | |
| 2008/0034370 A1 | 2/2008 | Huizenga | |
| 2008/0066070 A1 | 3/2008 | Markov | |
| 2008/0082979 A1* | 4/2008 | Coppinger et al. | 718/102 |
| 2008/0120619 A1 | 5/2008 | Podila | |
| 2008/0256238 A1* | 10/2008 | Hu et al. | 709/226 |
| 2008/0313639 A1* | 12/2008 | Kumar et al. | 718/104 |
| 2009/0025004 A1* | 1/2009 | Barnard et al. | 718/104 |
| 2009/0113442 A1* | 4/2009 | Deidda et al. | 718/105 |
| 2009/0193427 A1* | 7/2009 | Pu et al. | 718/104 |
| 2009/0198766 A1* | 8/2009 | Chen et al. | 709/202 |
| 2010/0023949 A1* | 1/2010 | Jackson | 718/104 |
| 2010/0042668 A1 | 2/2010 | Liang | |
| 2010/0083262 A1* | 4/2010 | Gulati et al. | 718/102 |
| 2010/0115526 A1 | 5/2010 | Mincarelli | |
| 2010/0162261 A1* | 6/2010 | Shashidhara | 718/105 |
| 2010/0207689 A1* | 8/2010 | Shimada | 327/551 |
| 2010/0269119 A1* | 10/2010 | Arimilli et al. | 719/313 |
| 2010/0290080 A1* | 11/2010 | Klassen | 358/1.15 |
| 2011/0093856 A1* | 4/2011 | Campbell et al. | 718/102 |
| 2012/0072765 A1* | 3/2012 | Bower et al. | 714/3 |

OTHER PUBLICATIONS

Michael Isard et al., "Quincy: Fair Scheduling for Distributed Computing Clusters", *Microsoft Research*, pp. 1-20, published 2009.

How the Compute Cluster Server Works, Microsoft, TechNet, Jun. 2006 (http://technet.microsoft.com/en-us/library/cc720072.aspx). See Chapters "Terms and definitions", "Creating and submitting jobs"—"Run-time job and task management" and Content format, 16 pages.

Baratloo et al., "Mehanisms for Just-inTime Allocation of Resources to Adaptive Parallel Programs", IEEE, Apr. 12-16, 1999, psges 1-7.

Streit "Self-Tuning Job Scheduling Strategies for the Resource Management of HPC Systems and Computational Grids", Paderborn, Oct. 2003, 166 pages.

Buisson et al, "Scheduling Malleable Applications in Multicluster Systems", CoreGRID Technical Report No. TR-0092, May 22, 2007, pp. 1-15.

How the Compute Cluster Server Works, Microsoft, TechNet, Jun. 2006 (http://technet.microsoft.com/en-us/library/cc720072.aspx). See Chapters "Terms and definitions", "Creating and submitting jobs"-"Run-time job and task management" and Content format, 16 pages.

Baratloo et al., "Mehanisms for Just-inTime Allocation of Resources to Adaptive Parallel Programs", IEEE, Apr. 12-16, 1999, pp. 1-7.

Streit, "Self-Tuning Job Scheduling Strategies for the Resource Management of HPC Systems and Computational Grids", Paderborn, Oct. 2003, 166 pages.

Vasupongayya et al., "On Job Fairness in Non-Preemptive Parallel Job Scheduling", Proceeding from Parallel and Distributed Computing and Systems, Nov. 14-16, 2005, 6 pages.

International Search Report and Written Opinion for PCT Application No. PCT/US2008/070147, dated Feb. 10, 2009, 11 pages.

European Search Report, Mailed Date: Oct. 20, 2011, Application No. EP 08 82 6472, Filed Date: Oct. 17, 2011, 7 pages.

U.S. Appl. No. 11/778,487, Non-Final Office Action mailed Mar. 10, 2011, 22 pages.

U.S. Appl. No. 11/778,487, Response to Non-Final Office Action mailed Mar. 10, 2011, filed Jul. 13, 2011, 9 pages.

U.S. Appl. No. 11/778,487, Final Office Action mailed Sep. 15, 2011, 17 pages.

U.S. Appl. No. 11/778,487, RCE-Response to Final Office Action mailed Sep. 15, 2011, filed Dec. 30, 2011, 13 pages.

U.S. Appl. No. 11/778,487, Non-Final Office Action mailed Jun. 20, 2013, 17 pages.

CN Application No. 200880024896X, Notice on the First Office Action, PCT Application in the National Phase, mailed Jun. 1, 2012, 13 pages.

CN Application No. 200880024896X, Amended Claims Response to First Office Action, filed Sep. 25, 2012, 24 pages.

CN Application No. 200880024896X, Notice on the Second Office Action, mailed Dec. 20, 2012, 9 pages.

CN Application No. 200880024896X, Amended Claims Response to Second Office Action, filed Jan. 5, 2013, 36 pages.

CN Application No. 200880024896X, Notice on Deeming to Have Abandoned the Right to Obtain the Patent, mailed Jul. 12, 2013, 2 pages.

EP Application No. 08 826 472.6, Response to Official Communication under Rules 70(2) and 70a(2) EPC dated Nov. 3, 2011, filed May 14, 2012, 21 pages.

JP Application No. 2010-517131, Notice of Final Rejection, mailed Jan. 4, 2013, 3 pages.

JP Application No. 2010-517131, Final Rejection, mailed May 31, 2013, 1 page.

* cited by examiner

COMPUTE CLUSTER WITH BALANCED RESOURCES

BACKGROUND

As computing needs of businesses and other organizations have grown, various computing architectures have been employed to meet these needs. One architecture involves the use of distributed computing clusters. A cluster contains multiple computers, each potentially with multiple processing cores, such that the cluster, as a whole, can provide substantial processing resources. A computer acting as a scheduler for the cluster can assign one or more of the cores to different jobs such that, at any time, the cluster can simultaneously execute multiple jobs, possibly from different clients.

A conventional policy used by schedulers in computing clusters to allocate computing resources to jobs is known as a first come, first served allocation. With such an approach, clients submit jobs to the scheduler. Along with a submission of a job, the client may specify a maximum and a minimum number of resources for that job. The scheduler queues jobs as they are received and assigns the jobs to resources as the resources become available. When the cluster contains enough resources, not already allocated to other jobs, to meet the minimum requirements of the first job in the queue, unassigned resources may be assigned to that job. That job may be assigned resources up to the maximum number of resources requested for that job. Other resources that are available may be assigned to other jobs that have been queued.

A refinement of a first come, first served policy is to incorporate priority of jobs into decisions about which jobs are first allocated resources. With this policy, jobs that are in the queue and ready to execute with higher priority are allocated resources before jobs with lower priority. Though, as between jobs of equal priority, those that are first added to the queue are first assigned resources.

SUMMARY

Increased responsiveness for jobs executed on a computing cluster may be provided with a scheduler for the cluster that uses a balanced scheduling policy. The policy may be balanced in the sense that a goal of the policy is to enable to as many jobs as possible to execute with computing resources allocated across the executing jobs in a way that, as closely as possible, achieves resource usage in accordance with priority or other parameters of the jobs. The policy may be implemented in multiple modes of operation of the scheduler.

In a first mode, the scheduler may attempt to allocate computing resources to meet declared minimum resource requirements of as many jobs ready to execute as possible. The computing resources assigned may be resources that are not allocated for execution of any other executing job. Though, in some embodiments, resources allocated in the first mode may include resources that are currently allocated for an executing job that has allocated to it more than its declared minimum resources. In this scenario, a resource may be de-allocated from a first executing job and then re-allocated to a second job to meet the declared minimum resource requirements of the second job.

In a second mode, resources in excess of those needed to meet the declared minimums in the aggregate of all executing jobs may be allocated to achieve a desired distribution of computing resources among the executing jobs. The distribution may be based, at least in part, on priority of the executing jobs, such that higher priority jobs may be allocated more computing resources. In this second mode, resources allocated to executing jobs may also be de-allocated for re-allocation to other jobs in order to achieve, as closely as possible, an allocation of resources in accordance with a desired distribution that has been computed based on the executing jobs and resources within the cluster.

In some embodiments, the scheduler may repetitively operate in at least the first mode and the second mode. The scheduler may enter the first mode when a job has been submitted to the scheduler and is ready for execution, but has not yet been allocated resources. The scheduler may enter the second mode in response to events during execution of jobs, including completion of processing in the first mode, termination of a job or freeing up of resources by an executing job. Alternatively or additionally, the scheduler may enter the second mode periodically or may operate in the second mode at any time when there are unallocated resources.

Accordingly, in one aspect, the invention relates to a method of operating a scheduler within a computing cluster to schedule a plurality of jobs for concurrent execution on resources of the computing cluster. The method may include receiving, for each of a plurality of jobs, a request for a minimum number of computing resources. A respective desired allocation of the resources may be computed for each of the plurality of jobs. The resources may then be adjusted among the plurality of jobs by identifying a first job of the plurality of jobs using less than the respective desired allocation of resources and identifying a second job of the plurality of jobs using more than the respective desired allocation of resources. Resources may be de-allocated from the second job and allocated to the first job.

In another aspect, the invention relates to a non-transitory computer-readable storage medium comprising computer-executable instructions that, when executed by a processor, perform a method of scheduling resources in a computing cluster. The method may include operation in first and second modes. The first mode may include allocating resources to at least one ready job in a ready queue, the resources being allocated to each of the at least one ready jobs based on a minimum resource requirement specified for the ready job. The second mode may include determining a desired respective allocation of resources for each of the plurality of executing jobs and adjusting resource usage by de-allocating a resource from at least one job using more than the respective desired allocation of resources and allocating the de-allocated resource to a job using less than the respective desired allocation of resources.

In yet another aspect, the invention may relate to a system with a plurality of computing nodes providing computing resources and a scheduler. The scheduler may include a ready queue holding jobs received from a plurality of clients and an allocator, executing on at least one processor, operating in a first mode and a second mode. In the first mode, the allocator may allocate available computing resources to ready jobs in the ready queue. The resources may be allocated to each of the ready jobs based on a minimum resource requirement specified for the ready job. In some embodiments, the available computing resources comprise un-allocated resources and resources allocated to executing jobs in excess of respective minimum requirements for the executing jobs. In the second mode, the allocator may determine a desired respective allocation of resources for each of the plurality of executing jobs. The allocator may then adjust resource usage by de-allocating a resource from at least one job using more than the respective desired allocation of resources and allocating the de-allocated resource to a job using less than the respective desired allocation of resources.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
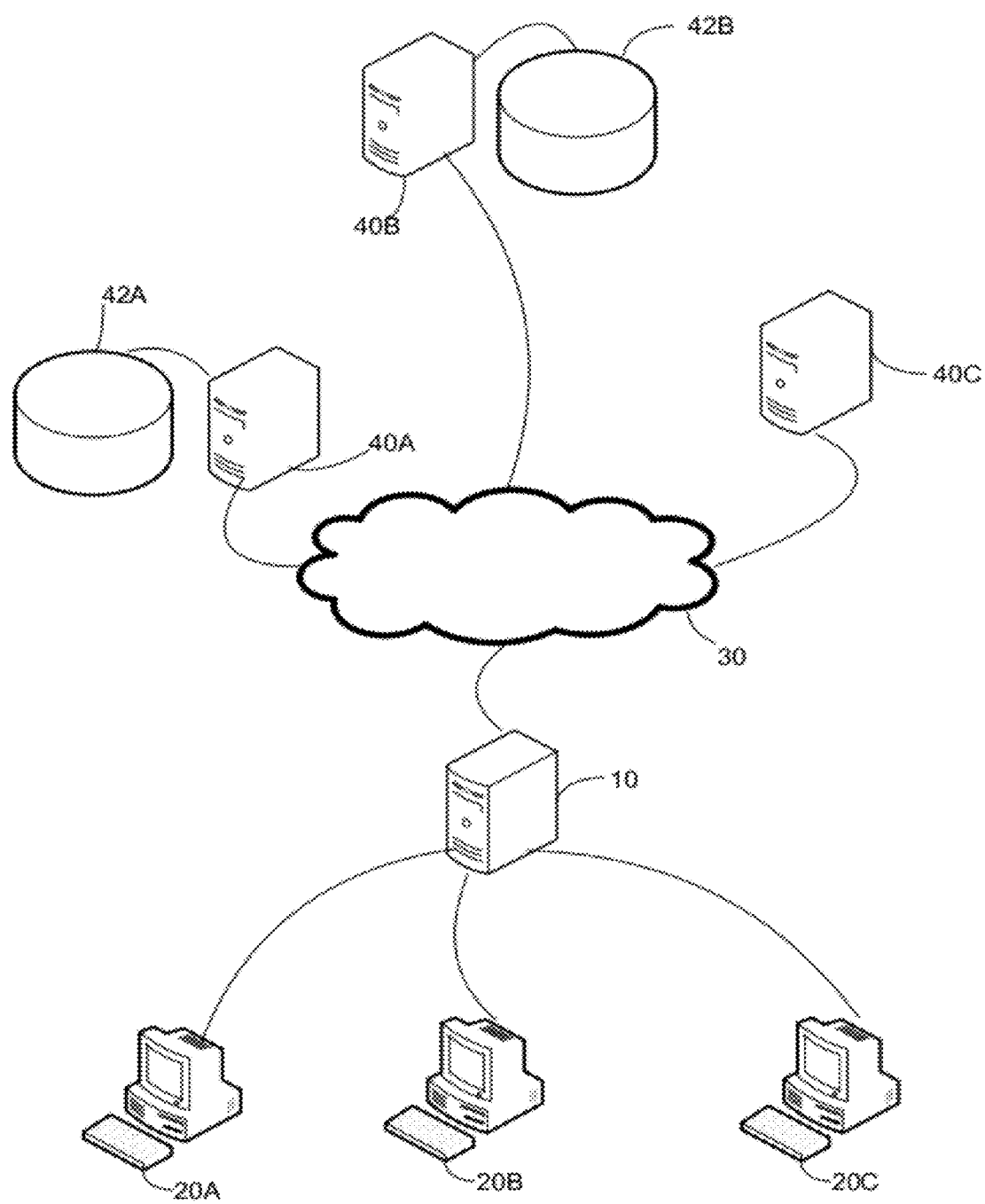
FIG. 1 is a conceptual sketch of an exemplary environment in which embodiments of the invention may be practiced.

The inventors have recognized and appreciated that a balanced scheduling policy can provide significant benefits to businesses or other entities operating computing clusters. The scheduling policy for a cluster may affect response time of the cluster such that a balanced policy may provide for faster response times. A balanced policy may also enable an administrator of a cluster to make and keep service level commitments to those using the cluster, such as commitments relating to response time or availability of resources to clients accessing the cluster.

A balanced scheduling policy may improve a user experience for a service oriented architecture or other applications that include numerous tasks that frequently can be performed independently, for example. These applications may have on the order hundreds of thousands or millions of parallel tasks and are sometimes described as "embarrassingly parallel." These tasks may be performed in multiple different jobs submitted to the compute cluster. In such applications, benefits, including shorter response times and greater usability, may be achieved by starting as many jobs as possible, even though each job may receive fewer resources than in a conventional scheduling policy.

In some embodiments, the policy may be balanced by allocating to each of multiple jobs submitted concurrently for execution on the cluster at least a minimum level of resources designated for the job. When total compute resources are inadequate to enable allocation of a designated minimum for all jobs ready for execution, some jobs may be queued until resources to meet their minimum requirements are available. Elements of the scheduling policy may control the order in which ready jobs are selected to receive an allocation of computing resources. For example, the policy may entail sorting ready jobs by priority and then by submit time. Nonetheless, when resources exist within the cluster to satisfy the designated minimum of all executing jobs and at least one other job ready for execution, resources may be allocated to that ready job even if doing so requires de-allocating resources from a job that is already executing. The resources of an executing job may be partially de-allocated or totally de-allocated, which may be achieved by canceling or re-queuing the job.

This process of allocating resources to as many ready jobs as possible may be performed in a first mode of operation of a scheduler for a cluster. The scheduler may operate in the first mode until all of the ready jobs have been scheduled for execution or a pool of resources, representing resources exceeding the aggregated minimum requirements of the executing jobs, has been depleted.

The scheduler also may operate in a second mode. In the second mode, the scheduler may allocate resources to achieve a desired distribution of resources among executing jobs. The scheduler may allocate resources to or de-allocate resources from each executing job to bring the resources allocated to each job closer to an amount specified for the job in accordance with the desired allocation.

The desired distribution may be dynamically computed based on the jobs executing at the time. This distribution, for example, may be recomputed periodically and/or in response to events, such as the initiation of a new job, termination of an existing job or a releasing of resources by an executing job. Though, embodiments are possible in which other events trigger re-computation of a desired allocation of resources or in which periodic checks are made for idle nodes such that the distribution may be recomputed if idle nodes are found.

A scheduler may be implemented in a computing cluster implemented in any suitable way. FIG. 1 illustrates an exemplary computing environment including such a computing cluster. The environment illustrated in FIG. 1 includes multiple computing devices that collectively form a computing cluster. In this example, computers 40A, 40B and 40C provide computing resources that may be used to execute jobs submitted to the cluster.

Though, FIG. 1 illustrates three computers 40A, 40B and 40C providing computing resources for the cluster, the invention may be employed with a cluster containing many more than three computers. Accordingly, the jobs submitted to scheduler 10 for execution on the cluster may require numerous operations for completion and, in some embodiments, may be embarrassing parallel.

In this context, a computing resource may be defined in units of "nodes," or some other unit of computing power that can be allocated for executing a job, either alone or in combination with other computing resources. In some embodiments, the structure of a node may be determined based on the architecture of the computing devices, such as computers 40A, 40B and 40C, that provide the computing power. In some embodiments, for example, each node may be a computer and an executing job may be allocated one or more of the computers. In such an embodiment, the physical computers define the unit of computing resources that can be allocated. In other embodiments, each of the computers may contain multiple processor chips that can be independently allocated to jobs submitted for execution by the computing cluster. In that embodiment, a processor chip, or "socket," may serve as the unit of computing resources. In yet other embodiments, one or more of the processor chips within computers, such as computers 40A, 40B and 40C, may contain multiple cores. The cores may be independently allocated to executing jobs submitted to the cluster. In that scenario, a core may define a unit of computing resources for the cluster.

It should be appreciated that a computing cluster may be operated according to embodiments of the invention using any suitable measure of computing resources. It should also be appreciated that, though a hardware component, such as a core, may be used as an example of a computing node, it is not a requirement that the resources be defined based on hardware partitions of the computers of the cluster. A node may be any limited resource that is used to do work within a computing system. In some embodiments, the computing resources may be virtualized, such that a direct relationship between a node, as managed by the cluster, and a physical component need not exist. As another example, a "node" may be a license to software that is license controlled such that a limited number of instances of that software may execute at one time.

It is not a requirement that all of the computing devices that form a cluster be the same. The computers 40A, 40B and 40C may have the same or different construction. In embodiments in which all computing devices forming the cluster are identical, the computing resources provided in the aggregate by the computers of the cluster may be completely interchangeable. Conversely, in some embodiments, some computing resources may be appropriate for executing some jobs while not appropriate for others. In the example of FIG. 1, computer 40A is shown coupled to a data storage system 42A and computer 40B is shown coupled to a data storage system 42B. In contrast, computer 40C is shown without an associated data storage system. Jobs that require extensive access to data that is in a data storage system, such as data storage system 42A or 42B, may be appropriate for execution on a resource within computers 40A or 40B but not on a computing resource within computer 40C.

In addition to differences in access to data storage, other differences between computing resources may impact the suitability for a particular resource for executing a particular job. Such differences may include speed of execution, access to a coprocessor or access to some other component such as a particular network. A scheduling policy may take such differences in the computing resources and requirements of jobs submitted for execution into account when allocating computing resources for each job.

Regardless of the nature of the computing resources, the resources may be allocated to jobs by a device operating as a scheduler. Here, scheduler 10 is implemented in a computing device that is coupled to computers 40A, 40B and 40C through network 30. Accordingly, scheduler 10 may provide commands to the nodes that instruct one or more of the nodes to execute jobs submitted to the cluster. The nodes may also communicate to scheduler 10 over network 30 that a task has been completed, terminated or otherwise that computing resources are no longer being used for all or a portion of a job. The two-way communication between scheduler 10 and computers 40A, 40B and 40C also allows scheduler 10 to issue commands to the nodes to terminate execution of a job.

Scheduler 10 may receive jobs for execution on the cluster in any suitable way. In the example of FIG. 1, multiple clients, illustrated as clients 20A, 20B and 20C, may submit jobs to scheduler 10. Clients 20A, 20B and 20C may be coupled directly to scheduler 10 or over a network of any suitable type. The nature of the jobs submitted by clients 20A, 20B and 20C is not critical to the invention. However, such jobs may request execution of a service hosted on the cluster in accordance with a service oriented architecture as is known in the art.

In the example illustrated, clients 20A, 20B and 20C are illustrated as being desk top computers. It should be appreciated that jobs submitted to scheduler 10 may be initiated by individual users operating individual computers. Though, it should also be appreciated that jobs submitted to scheduler 10 may be initiated from any suitable source, including other computer systems such that the illustration of clients 20A, 20B and 20C as desktop computers should be regarded as an example only.

The components of the computing cluster of FIG. 1 may be implemented in any suitable way including using components as are known in the art. Though, scheduler 10 may implement a balanced policy to provide desired performance characteristics for the cluster when executing those jobs. Scheduler 10 may be configured to execute such a policy in any suitable way. In some embodiments, scheduler 10 may be configured through programming that implements the policy.

Figure 2:
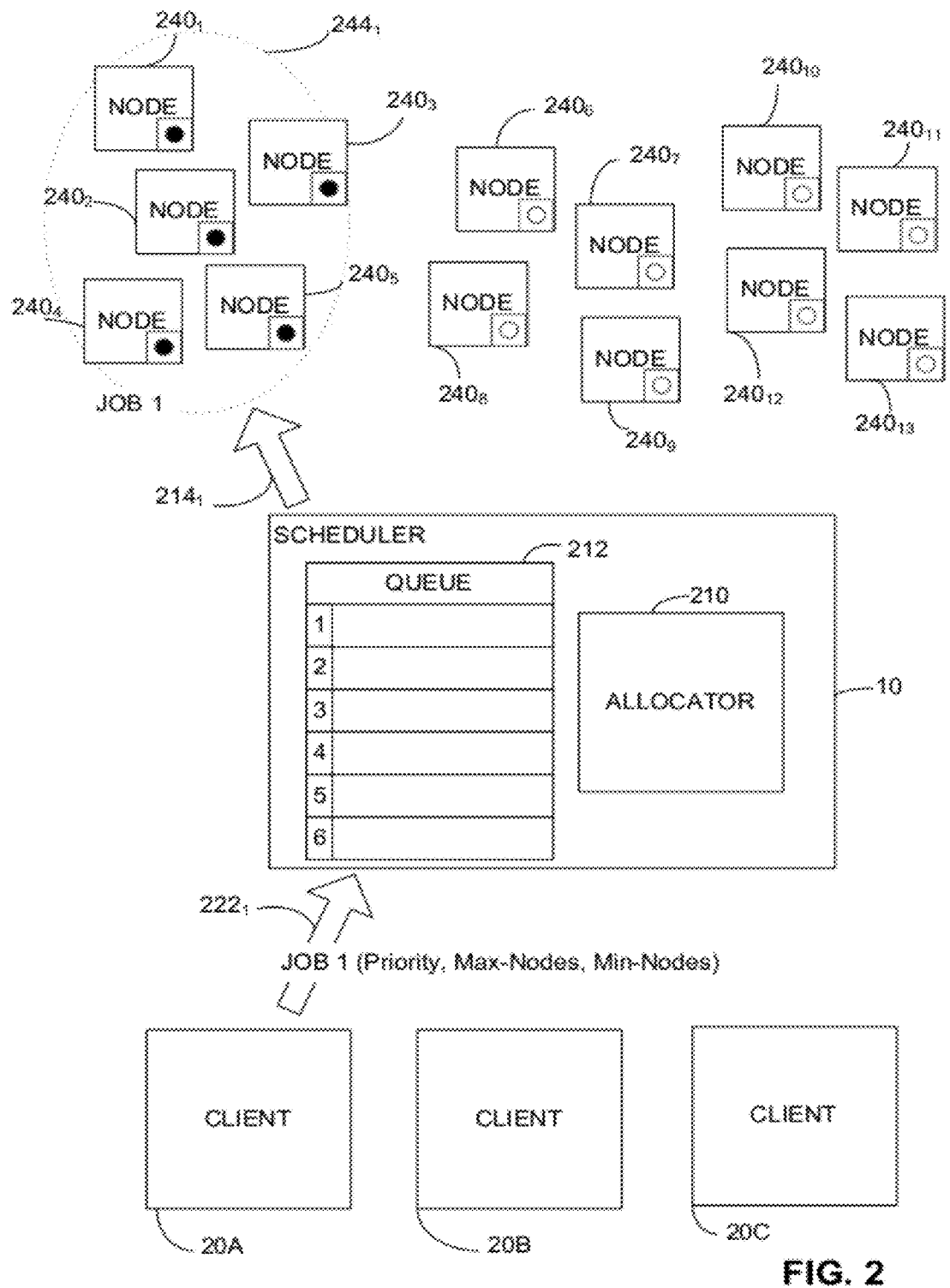
FIG. 2 is a functional block diagram illustrating a computing cluster in operation.

FIG. 2 illustrates additional details of scheduler 10. As shown, scheduler 10 may include an allocator 210 and a queue 212. As each of the clients, such as clients 20A, 20B and 20C, submit jobs to scheduler 10, allocator 210 may allocate an appropriate group of computing resources to the job. Allocator 210 may select the appropriate group of computing resources based on characteristics of the resources, the nature of the job submitted and the policy implemented by scheduler 10.

In the scenario illustrated in FIG. 2, client 20A has submitted a job $222_1$ to scheduler 10. Submission of a job may entail communicating information from client 20A to scheduler 10 sufficient to allow scheduler 10 to select and allocate computing resources to the job and to initiate execution of the job on the allocated computing resources. This information may be communicated in any suitable way, including using protocols that are known in the art. In the illustrated embodiment, in addition to an identification of the job, client 20A sends to scheduler 10 values of parameters that may be used by allocator 210 in selecting a number of nodes to execute job $222_1$.

In the example of FIG. 2, those parameters include a priority of the job and a maximum number of nodes and a minimum number of nodes. In the embodiment illustrated, allocator 210 does not allocate nodes to job $222_1$ unless a number of nodes meeting the designated minimum are available for allocation to the job. Allocator 210 uses the designation of the maximum number of nodes to limit the amount of resources assigned for executing job $222_1$. Allocator 210 may use the priority when balancing resources among multiple jobs. When scheduler 10 receives requests for executing jobs that, in the aggregate, have designated minimum computing resources that exceed the resources within the computing cluster, allocator 210 may use the priority values associated with the jobs to select jobs for execution first. In scenarios in which there are adequate computing resources to meet the designated minimum requirements in the aggregate for all jobs but not to meet the designated maximums, allocator 210 may use the priority values for the jobs to allocate resources, in excess of the aggregated minimums, to the executing jobs.

Values of parameters accompanying each job may be determined in any suitable way. In some embodiments, an entity submitting a job may select values of the parameters for that job. For example, a user or administrator of a client may assign values to each individual job submitted by the client or may assign values that are used for all jobs submitted by the client. Moreover, an administrator might constrain different groups of users to certain values only.

Values may be selected, for example, based on the nature of the job. Jobs that require a fast response, for example, may be assigned a high priority. Simple jobs that do not include large numbers of tasks that can be performed in parallel may have a relatively low minimum resource requirement and a relatively low maximum resource requirement associated with them. Though, the values of parameters associated with each job may be assigned in any suitable way. In some embodiments, the values may be determined based on characteristics of the client or a service level agreement between an administrator of the computing cluster and an operator of the client computer.

Regardless of how the values are selected, allocator 210 may use the values to determine an appropriate number of nodes to assign to each job scheduled for execution. In scenarios in which the cluster does not contain sufficient nodes for all jobs ready for execution to be allocated their designated minimum number of nodes, the values may also be used by allocator 210 to select the order in which ready jobs are scheduled for execution.

Jobs that cannot be scheduled for execution because of a lack of available resources may be stored in ready queue 212. Ready queue 212 may be implemented in computer storage media associated with scheduler 212 using conventional queuing techniques. Though, queue 212 may be implemented in any suitable way.

The scenario illustrated in FIG. 2 corresponds to a scenario in which resources have not previously been allocated to any executing job and a first job, job $222_1$, is being initiated. Accordingly, as scheduler 10 receives job $222_1$, allocator 210 determines an allocation $214_1$ of nodes on which job $222_1$ may be executed. In this scenario, allocation $214_1$ identifies a group $244_1$ of nodes made up of nodes $240_1 \ldots 240_5$. Allocator 210 may select the number of nodes in group $244_1$ according to a balanced scheduling policy as described in greater detail below.

Once the nodes in group $244_1$ are selected, they may be configured for execution of job $222_1$ using techniques as are known in the art or any suitable technique. For example, one or more of the nodes $240_1 \ldots 240_5$ may be designated to execute a root task of job $222_1$. The other nodes may be used to execute worker tasks that perform the operations within job $222_1$. The root task may coordinate which nodes in group $244_1$ execute tasks that make up job $222_1$. The root node, using techniques as are known in the art, may communicate with scheduler 10 to indicate when the job has completed execution or other events associated with the execution of the job $222_1$. As one example, a root task may communicate to scheduler 10 that the job is winding down execution such that some of the nodes within group $244_1$ may be de-allocated.

In the scenario illustrated in FIG. 2, there is no contention for computing resources within the cluster. Accordingly, allocator 210 may allocate to job $222_1$ the designated maximum resource requirement for that job. Even with this allocation, nodes $240_6 \ldots 240_{13}$ remain available for allocation to other jobs. Though, as additional jobs are submitted for execution, the computing resources available in this computing cluster may be inadequate to meet the maximum resource requirement for all jobs. In that case, allocator 210 may apply a balanced scheduling policy to determine which jobs are allocated resources and the number of nodes assigned to each job.

Figure 3:
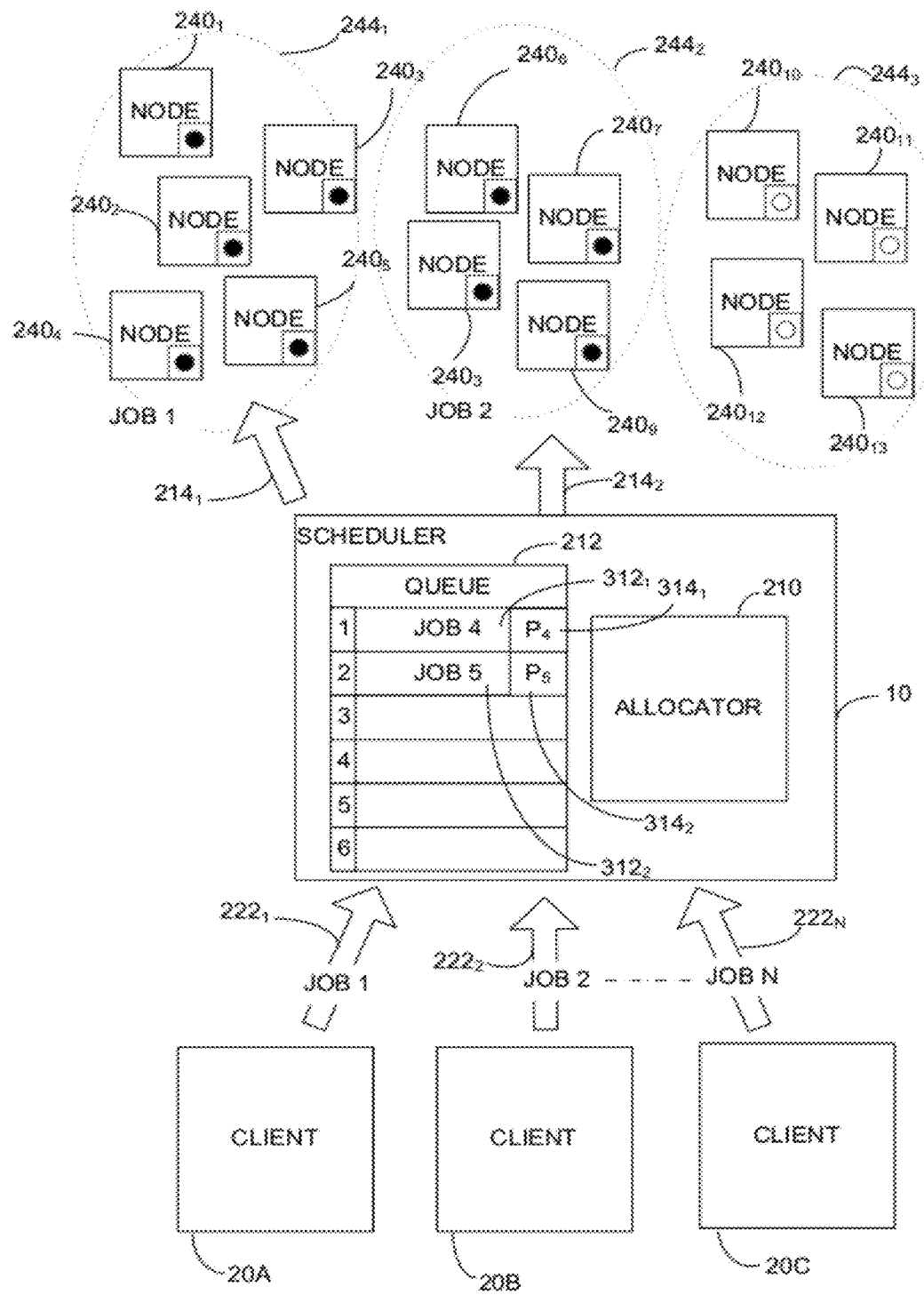
FIG. 3 is a functional block diagram showing an alternative operating state of the computing cluster illustrated in FIG. 2.

FIG. 3 illustrates the cluster computing environment of FIG. 2 in a later operating state when further jobs have been submitted by the clients 20A . . . 20C and scheduled for execution by scheduler 10. As shown in FIG. 3, a second job $222_2$ has been submitted and allocator 210 has made a second allocation $214_2$, allocating a second group $244_2$ of nodes to job $222_2$. A further job may have been allocated resources $244_3$. Though, in the state illustrated in FIG. 3, resources in group $244_3$ have been de-allocated based on an event indicating completion or termination of that job. Accordingly, the resources in group $244_3$ represent unused resources that may be assigned to other jobs that are ready for execution.

In the scenario illustrated in FIG. 3, queue 212 contains jobs that are ready for execution. As shown, queue 212 contains an entry for each job that was submitted for execution but has not yet been scheduled and values of parameters submitted with that job. Accordingly, entry $312_1$ identifies a job, job 4 in this example, and associated parameters $314_1$. Entry $312_2$ identifies a further job, job 5 in this example, and associated parameters $314_2$. In the example illustrated, queue 212 serves as a mechanism to preserve a time order of jobs. In this case, job 4 was submitted in advance of job 5 and is therefore ahead of job 5 in queue 212. Though it should be appreciated that any suitable mechanism may be used to track a time order of jobs.

Entry $312_1$ and entry $312_2$ indicate jobs that were received at scheduler 10 but for which resources were not immediately available for allocation to those jobs. Allocator 210 may assign nodes to those jobs from group $244_3$, representing resources that are currently unused. Though, if the unused pool of resources, represented by group $244_3$ in the scenario of the FIG. 3, is not adequate to meet the minimum requirements of the jobs in queue 212, allocator 210 may evaluate whether it is appropriate to de-allocate resources from either of group $244_1$ and $244_2$. In accordance with some embodiments of a balanced allocation policy, which is described in greater detail below, if more resources than are available in group $244_3$ are necessary to meet the designated minimum requirements for the jobs in queue 212, allocator 210 may de-allocate resources from groups $244_1$ and $244_2$. Resources may be de-allocated from groups $244_1$ and $244_2$ if the resources in those groups are greater than are needed to meet the designated minimums for the jobs executing on those groups of resources.

Once resources have been allocated to achieve at least an allocation of at least a designated minimum for each job ready for execution, scheduler 10 may balance the allocation of resources among the executing jobs. Balancing resources may entail de-allocating and re-allocating resources to executing jobs to achieve a desired allocation.

Figure 4:
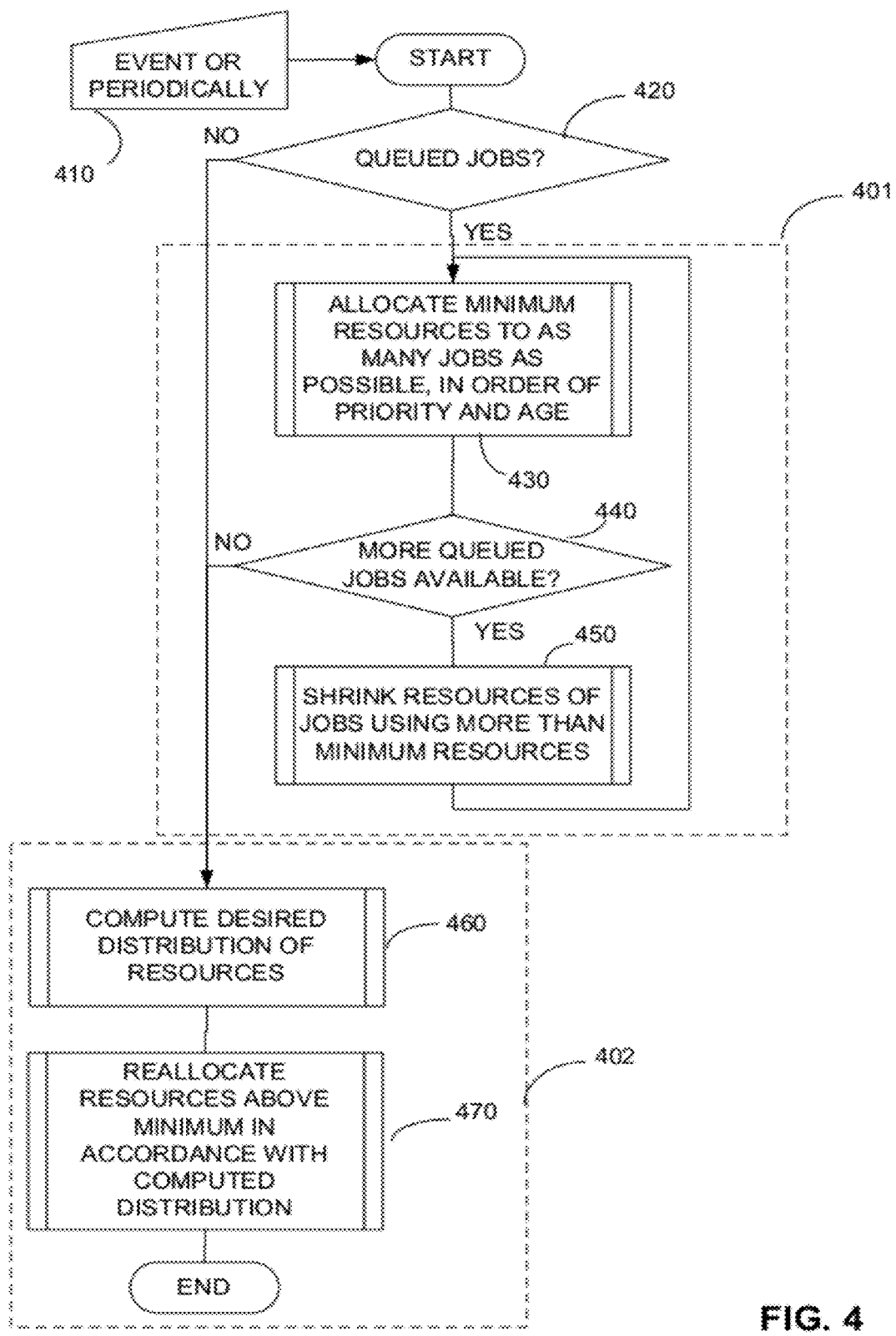
FIG. 4 is a flow chart of a method of operating a scheduler according to some embodiments of the invention.

In some embodiments, allocator 210 may be programmed to operate according to a process as illustrated in FIG. 4. The process of FIG. 4 includes two modes of operation. In a first mode, mode 401, allocator 210 attempts to allocate resources to as many jobs as possible so that execution of those jobs may be initiated. In the second mode, mode 402, allocator 210 attempts to balance the allocation of resources among the executing jobs. FIG. 4 illustrates the overall processing performed by allocator 210, including the inter-relationship between modes 401 and 402.

The process of FIG. 4 may begin at any suitable time. A condition 410 may initiate execution of the process of FIG. 4. Condition 410, for example, may be an event related to one or more of the jobs. Such an event, for example, may include receipt of a job at scheduler 10. As another example, an event may include an indication that a job, previously scheduled for execution, has completed or released computing nodes that were allocated to it. Though, it is not a requirement that the process of FIG. 4 be purely event driven. The process may be initiated periodically such that a desired allocation of resources to jobs may be recomputed and/or an attempt may periodically be made to adjust allocation of resources to achieve the desired allocation.

Regardless of the conditions that trigger execution of the process of FIG. 4, the process may begin at decision block 420. At decision block 420, the processing may branch depending on whether there are queued jobs. If there are queued jobs, meaning that jobs have been received by scheduler 10 but have not yet been allocated resources for execution, the process branches from decision block 420 such that operation in mode 401 is initiated. Conversely, if there are no queued jobs, the process may branch such that processing in mode 402 is initiated.

When processing branches from decision block 420 to begin processing in mode 401, sub-process 430 may be initiated. In sub-process 430, allocator 210 may attempt to allocate the designated minimum number of nodes to as many of the queued jobs as possible. Though, in determining which of the queued jobs should first be allocated resources, allocator 210 may consider the jobs in order of priority and age. In an embodiment in which a queue is used to preserve time order, jobs may be considered in order of priority and age by identifying the highest priority of any job in the queue and then selecting the first such job with that priority. Though, it should be appreciated that any suitable technique may be used to determine an order in which resources are allocated to jobs.

Processing at block 430 may initially entail assigning computing nodes that are not allocated for any executing job. For example, FIG. 3 illustrates groups $244_1$ and $244_2$ are allocated for execution of jobs. In contrast, group $244_3$ contains nodes not, at the time illustrated in FIG. 3, allocated for execution of any job. Accordingly, group $244_3$ represents unallocated-nodes that may be assigned at block 430.

Processing at block 430 may allocate, from the pool of unallocated nodes, the designated minimum number of resources for as many queued jobs as possible. Processing at block 430 may end when the designated minimum number of nodes has been assigned to each job in the queue or when there are insufficient unallocated nodes to meet the minimum resource requirements for any further jobs in the queue.

When processing at block 430 ends, the process of FIG. 4 may proceed to decision block 440 where the process may branch depending on whether additional jobs in the queue can be allocated their designated minimum amount of computing resources by shrinking the resources allocated to other jobs. If so, the process may branch from decision block 440 to block 450. At block 450, processing may entail reducing the allocation of computing resources to jobs that have been allocated more than their respective minimums of computing resources. By shrinking these allocations, computing resources may be freed up to meet the designated minimums for further jobs. Accordingly, following execution of block 450, processing may loop back to block 430 where the freed up resources may be allocated to meet the minimums of additional ready jobs. In this way, one or more additional ready jobs may be removed from the queue and allocated resources such that execution of those jobs maybe initiated.

Processing may continue in this loop during mode 401 until either there are no further jobs in the ready queue or there are no further jobs using more than their designated minimum resources that can have their resource allocations reduced to free up sufficient resources to meet the designated minimum for another job in the queue.

When such a condition indicating the end of processing in mode 401 is encountered, processing may branch from decision block 440 to begin execution in mode 402. In mode 402, resource allocations among all executing jobs may be balanced. In the embodiment illustrated, balancing may be performed to distribute resources that exceed those needed to meet, in the aggregate, the designated minimums for all executing jobs. These resources may be distributed generally proportional to the priorities of the executing jobs or other parameter that serves as a basis for determining relative amount of resources desirable for each job. Because such a distribution may be depend on the actual jobs running at the time, processing in mode 402 may begin at sub-process 460 where a desired distribution of resources is computed. Such a computation may entail computing a respective desired allocation of computing resources for each job then executing.

Processing may continue at sub-process 470 based on the computed desired distribution. At sub-process 470, computing resources may be allocated to achieve, as closely as possible, the desired distribution of resources. The reallocation at sub-process 470 may entail deallocating resources from jobs that have allocated to them more than their respective computed desired allocation. Resources de-allocated in this fashion may then be allocated to jobs having allocated to them less than their respective computed desired allocation of resources.

Figure 5:
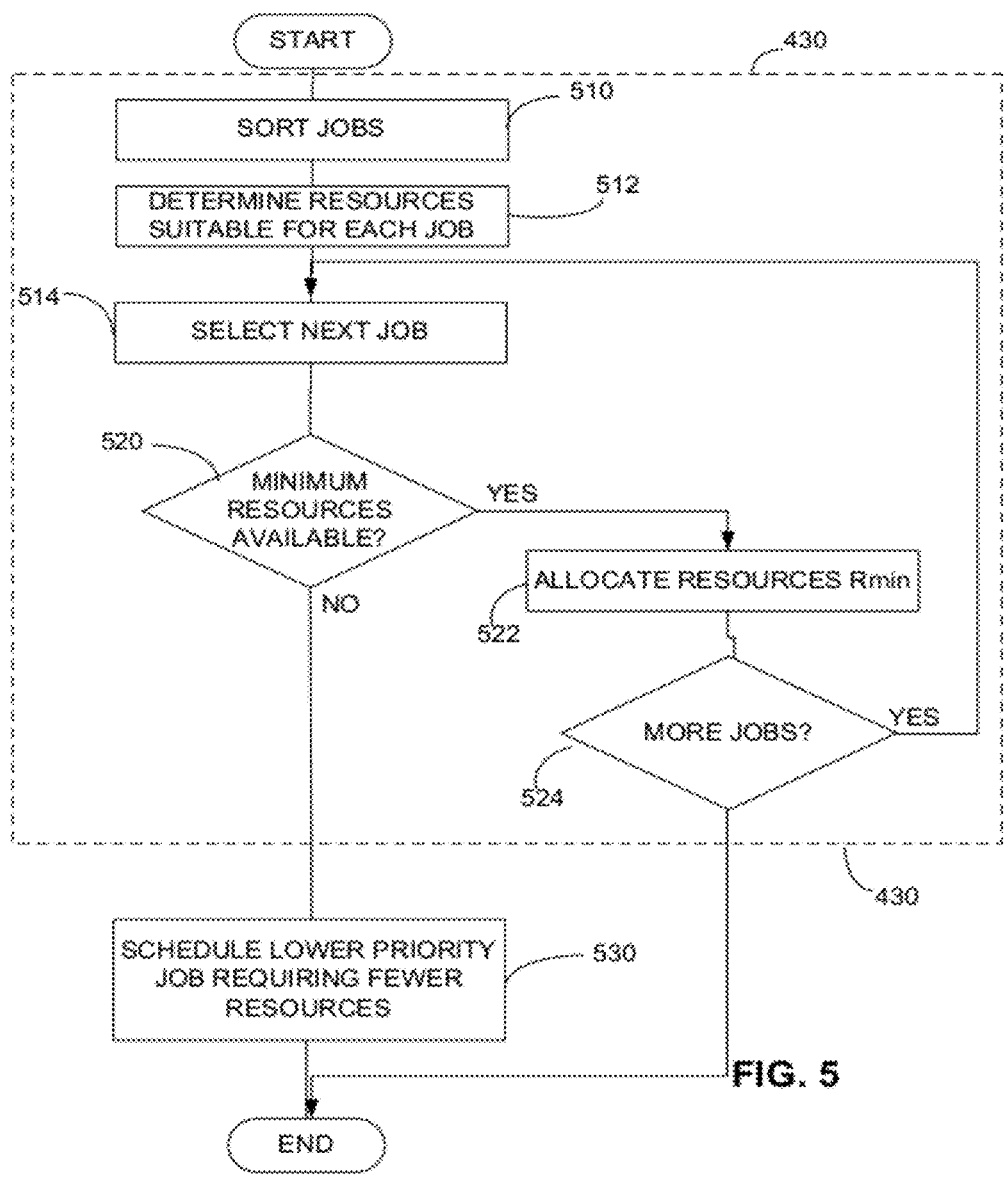
FIG. 5 is a flow chart of a process of allocating a designated minimum amount of resources to ready jobs.

Though not expressly illustrated in FIG. 4, in some embodiments, the usability of resources by other jobs may be considered in determining which resources to de-allocate and whether to de-allocate them. For example, in scenarios in which a particular computing node is unusable by a job using less than its computed desired amount of computing resources, that node may not be de-allocated from a job that is currently using it. A node may be unusable, for example, because of the physical configuration of the node, resource requirements of the job, the configuration of the cluster or for any other reason, Further details of operation in modes 401 and 402 are provided in connection with FIGS. 5-7B, below. FIG. 5 shows in further details processing that may be performed to implement sub-process 430 in which computing resources are allocated to meet the designated minimum requirements for as many jobs as possible. As illustrated in FIG. 5, sub-process 430 may begin with block 510. At block 510, jobs in the queue, representing jobs ready for execution, may be sorted. In the embodiment illustrated in FIG. 4, jobs are processed in order of priority and age. Accordingly, sorting the jobs at block 510 may entail ordering the jobs in the queue such that jobs of the highest priority appear first, followed by jobs in succeeding order of priority. If there is more than one job with the same priority level, processing at block 510 may entail ordering jobs with the same priority to preserve their order in the queue. In this way, for each priority level, jobs may be ordered based on their time in the queue such that jobs that have been waiting longer for execution will be scheduled ahead of jobs with the same priority level waiting a shorter period of time.

At block 512, resources suitable for execution of each job waiting for an allocation of resources are determined. As described above in connection with FIG. 1, because of system architectural or other factors, some computing resources may be suitable for allocation to certain jobs but not others. Allocator 210 may be programmed so as to only allocate to a job resources that are suitable for that job. Accordingly, at block 512, an identification of which resources are suitable for execution of each of the queued jobs.

Suitability of resources for a job may be determined in any suitable way. For example, each of the computing nodes may have a list of characteristics associated with it. The parameters associated with each job may include an indication of characteristics of suitable computing resources for that job. Such information may be provided by a cluster administrator, a programmer that defines a job or any other suitable way, including techniques as are known in the art. Further, suitability may be determined in accordance with a policy established by an administrator of the computing cluster or other suitable party. As a specific example, suitability may be defined based on location of data accessed during execution of a job. In the example of FIG. 1, a job may access during execution data in data store 42A. Though computer 40C may be able to access data store 42A over network 30, a policy of the cluster administrator may indicate that a job accessing data in data store 42A execute on a core within computer 40A in order to minimize network traffic on network 30. Such a requirement may be used to determine that nodes within computer 40C are unsuitable for allocation to a job that access data in data store 42A. In addition to location of data, any other criteria may alternatively or additionally be used to determine suitability of a node for allocation to a particular job. Moreover, it should be appreciated that "suitability" need not be binary. In some instances, one node may have characteristics that make it more suitable than other nodes for a particular task. When an available node is less suitable than others that are not available, a policy or other suitable criteria may be used to determine whether the available node will be allocated to a task or the scheduler will wait for a more suitable node to be available.

Regardless of how suitability of resources is determined at block 512, processing may proceed to block 514. At block 514, the next job in the order established in block 510 may be selected. In the first iteration through the loop including block 514, decision block 520 and block 522, the first job in the order created at block 510 may be processed. In subsequent iterations, jobs may be successively processed in the order established at block 510.

Once a job is selected, the process may branch at decision block 520 depending on availability of resources for the selected job. Processing at decision block 520 may entail comparing resources identified at block 512 to be suitable for the selected job to a pool of unallocated resources. In embodiments in which computing resources are allocated by allocating nodes to a job, the information collected at block 512 may indicate specific nodes suitable for processing each of the jobs in the ready queue. Processing at block 520 may entail determining the number of nodes indicated to be suitable for the selected job that are unallocated. If this number exceeds the designated minimum for the selected job, processing may branch from decision block 520 to block 522. At block 522, that minimum number of nodes may be allocated to the job.

Once an allocation of nodes for the selected job is completed, processing may branch at decision block 524. Processing may branch at decision block 524 depending on whether further ready jobs remain for processing. If so, processing loops back to block 514 where the next job is selected and an attempt is made to allocate the minimum resources available to that job. Conversely, if all of the jobs have been processed, sub-process 430 may end.

Sub-process 430 may also end if, at decision block 520 it is determined that the pool of unallocated resources does not contain enough resources to meet the designated minimum resources for the selected job. If sub-process 430 ends because minimum resources are not available for the selected job, FIG. 5 illustrates an alternative step that may be performed. At block 530, an attempt may be made to find the minimum resources for any other job in the queue. Though, as described above in connection with FIG. 4, resources are allocated to jobs in order of priority and age, because different jobs may have different designated minimums, a failure to find sufficient jobs to meet the minimum for the next job in the order established at block 510 does not necessarily mean that the designated minimum for another job lower in the order could not be found. By performing the optional processing at block 530, in cases where there is a newer or lower priority job in the queue that has a smaller designated minimum resource requirement, performing the processing at block 530 may increase the number of concurrently executing jobs. Though, it is also possible to avoid starvation of the job that was skipped over by reserving resources for it that cannot be used by the newer or lower job priority jobs.

As indicated in FIG. 4, once the unallocated resources are allocated to meet the minimum designated resource requirements for as many jobs as possible in sub-process 430, sub-process 450 may be performed. In sub-process 450, resources allocated to some jobs in excess of their designated minimums may be reduced in order to free up resources that can be used to meet the designated minimums for jobs.

Figure 6:
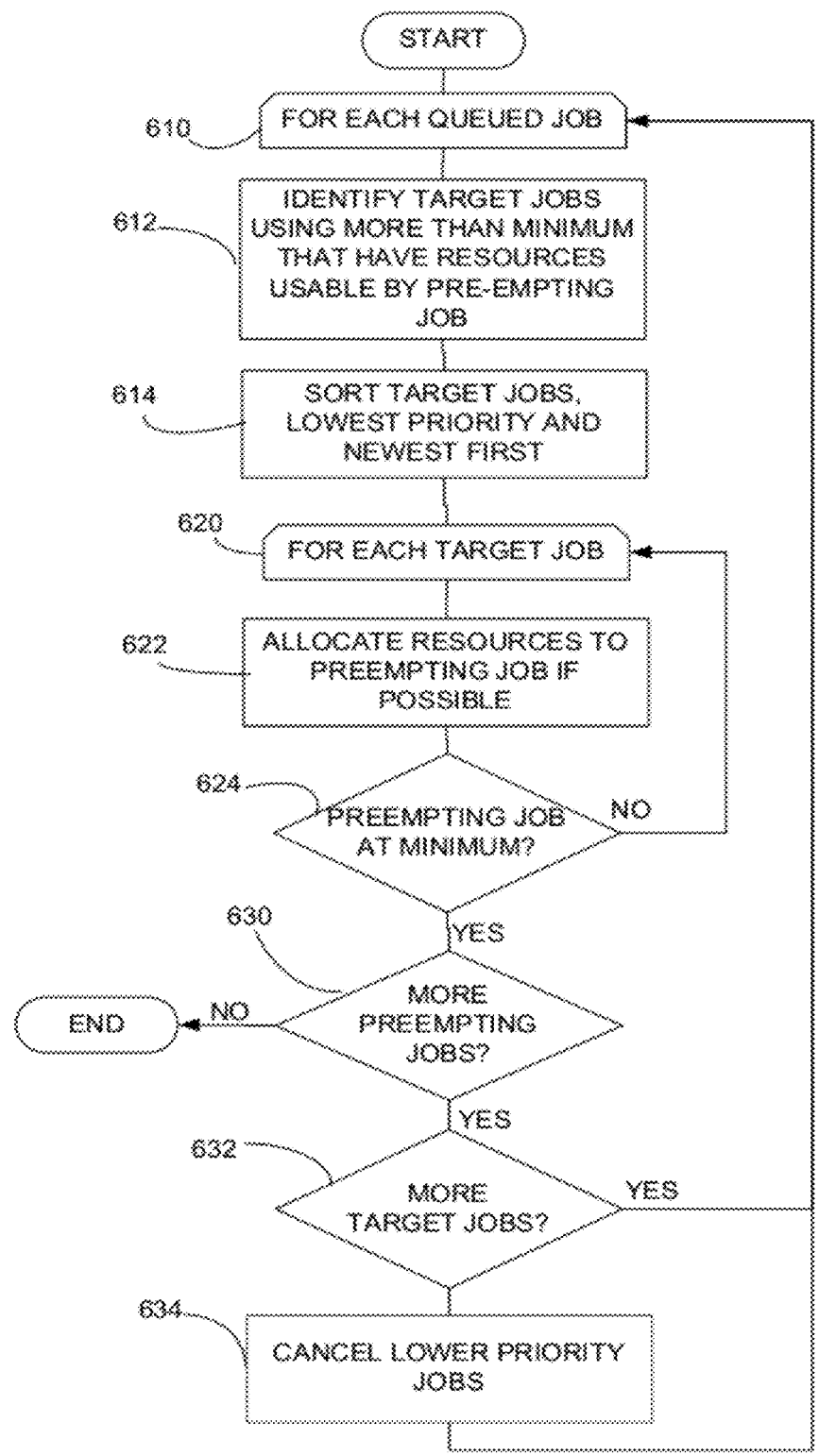
FIG. 6 is a flow chart of a process of shrinking resources allocated to executing jobs.

FIG. 6 is an example of processing that may be performed to de-allocate resources from some jobs and to re-allocate those resources to other jobs. As shown in FIG. 6, processing may begin at loop-start 610. Loop-start-610 indicates the beginning of a loop that may be performed for each job that is in a ready queue, such as queue 212. In each iteration of this loop, queued jobs may be processed in an order such as may be established by the list produced at block 510 (FIG. 5) or in any other suitable way.

This processing may result in nodes allocated to already executing jobs may be de-allocated from those jobs such that those nodes can be reallocated to meet the designated minimum for a job in the queue awaiting execution. Deallocating a node from an executing job will result in canceling the computing tasks being performed on that node. Accordingly, the jobs in the queue for which resources are being sought may be regarded as "preempting" jobs. Jobs from which resources are de-allocated may be regarded as "target jobs."

Accordingly, processing at block 612 may entail identifying, for a queued job that is a preempting job, target jobs that have resources that can be de-allocated and then re-allocated to the preempting job. Processing at block 612 may entail applying one or more criteria to determine whether a target job has allocated to it computing resources that may be de-allocated and then re-allocated to the preempting job. One such criterion may be whether the target job is using more than its designated minimum resources. Other criteria may relate to the nature of the resources allocated to that job. In embodiments in which different computing nodes are capable of performing different computing functions, only some nodes may be suitable for allocation to a preempting job. Accordingly, for each queued job that is processed as a preempting job at block 612, usable resources associated with each possible target job may be identified. Once identified, this information may be stored in any suitable way for later processing. For example, the identified target jobs, and the associated nodes that could be preempted for those target jobs, may be stored in a data structure in computer memory.

Regardless of the manner in which the identified target jobs are stored, processing may proceed to block 614 where the target jobs are sorted to define an order in which they will be processed. As a specific example, the identified target jobs may be stored at block 612 in a computer data structure that implements a list. Processing at block 614 may entail reordering the entries in the list to sort the target jobs such that jobs with the lowest priority appear first in the list. Such a sorting criteria may be selected, for example, because processing lower priority jobs first means that higher priority jobs are more likely to continue to completion faster.

In scenarios in which multiple target jobs are assigned the same priority level, the target jobs at each level may be organized such that the newest executing job is ordered first. A "newer" executing job may be defined as a job that has been executing for a shorter time than an older executing job. This ordering may be based, for example, on a time from when execution of each target job was initiated. Though, this relative ordering need not be based on absolute time. In some embodiments, for example, the ordering may be based on a percentage of the job completed or other criteria that indicates a relative amount of computing resources that may be consumed when a resource associated with a target job is de-allocated from that job and tasks executing on that resource are rescheduled at a later time.

The ordering performed at block 614 may help identify computing resources that, if de-allocated from the job that they are currently executing, will result in a small amount of disruption to the executing jobs. Processing newer jobs first means that less processing that has already been performed will be repeated if a task is canceled when the node is de-allocated is later rescheduled.

Once the target jobs are sorted at block 614, processing may proceed to loop-start 620. Loop-start 620 may represent the beginning of a loop that is repeated for each of the target jobs identified at block 612. The target jobs may be processed within that loop in the order established at block 614. Within the loop, at block 622, computing resources from the target job being processed at that iteration of the loop may be allocated to the preempting job also being processed. Though, processing at block 622 may only de-allocate resources from the target job if they can both be de-allocated and re-allocated. For example, if a computing node selected for de-allocation from a target job is in an executing state in which the task executing on that node cannot be canceled and rescheduled for execution at a later time, that node may not be allocated to the preempting job at block 622. Any suitable criteria may be used to determine whether a node can be de-allocated from a target job at the time processing is performed at block 622.

Once the processing at block 622 is completed, the process of FIG. 6 may branch at decision block 624 depending on whether any allocation made at block 622 has resulted in the preempting job having allocated to it resources meeting its designated minimum. If not, processing may loop from decision block 624 back to loop-start 620. This loop back may be performed conditionally based on whether there are further target jobs in the list produced at block 614 that remain for processing or may be conditioned on any other suitable criteria.

If, as a result of processing within the loop that starts at loop-start 620, sufficient resources are allocated to the preempting job to meet the designated minimum resource requirement for that job, processing may branch from decision block 624 to decision block 630.

At decision block 630, the process may again branch, depending on whether there remain more jobs in the queue that could serve as preempting jobs. If not, the processing of FIG. 6 may end. Conversely, if there are more jobs queued and ready for execution, the process may branch from decision block 630 to decision block 632.

At decision block 632, the process may again branch depending on whether there are further jobs that have computing resources allocated to them above the respective designated minimum resource requirements for those jobs. If so, there remain executing jobs that could serve at target jobs. In this scenario, processing of FIG. 6 loops back to loop-start 610. When processing returns to loop-start 610, the next queued job in the list produced at block 510 (FIG. 5) may be selected as the preempting job. This preempting job may be processed, as described above, to identify target jobs with resources that can be de-allocated and then reallocated to the preempting job.

Processing within the loop that begins at loop-start 610 may proceed iteratively in this fashion until there are no further queued jobs that may serve as preempting jobs or there are no further executing jobs that could serve as target jobs. If there are no further preempting jobs remaining for process-ing, the processing of FIG. 6 may end by branching from decision block 630. When there are no further executing jobs that have allocated to them resources above their respective designated minimum resource requirements, the process may end at decision block 632 because there are no further target jobs for processing.

Though, FIG. 6 also illustrates a possible alternative embodiment in which processing branches from decision block 632 to block 634 when there are no further target jobs. If processing reaches block 634, there remain preempting jobs in the queue for which the minimum resource requirements could not be met simply by de-allocating resources exceeding the minimums allocated to executing jobs. Resources may nonetheless be de-allocated from an executing job and allocated to a preempting job in order to allow the preempting job to execute with its designated minimum resource requirements. Though, in this scenario, deallocating resources from an executing job will result in the job for which resource de-allocated having less than its designated minimum resource requirements. Accordingly, rather than continue execution of the job, that job is canceled at block 634. Thereafter, processing may loop back to loop-start 610 where any further queued jobs may be processed, possibly receiving an allocation of resources made available by canceling lower priority jobs at block 634 or possibly resulting gin cancellation of additional lower priority jobs.

It should be appreciated that the flow chart of FIG. 6 provides a simplified illustration of a process that may be performed for reallocating resources in a way that increases the number of queued jobs that can execute using their respective designated minimum resource requirements. Other steps may alternatively or additionally be performed. For example, though not expressly indicated in FIG. 6, processing may include additional steps to verify that resources that are identified for de-allocation from a target job not be de-allocated unless a sufficient number of resources are identified to allow a preempting job to meet its designated minimum resource requirements. Such processing may ensure that resources are not removed from a target job unless that removal will result in scheduling a further job for execution.

Figure 7A:
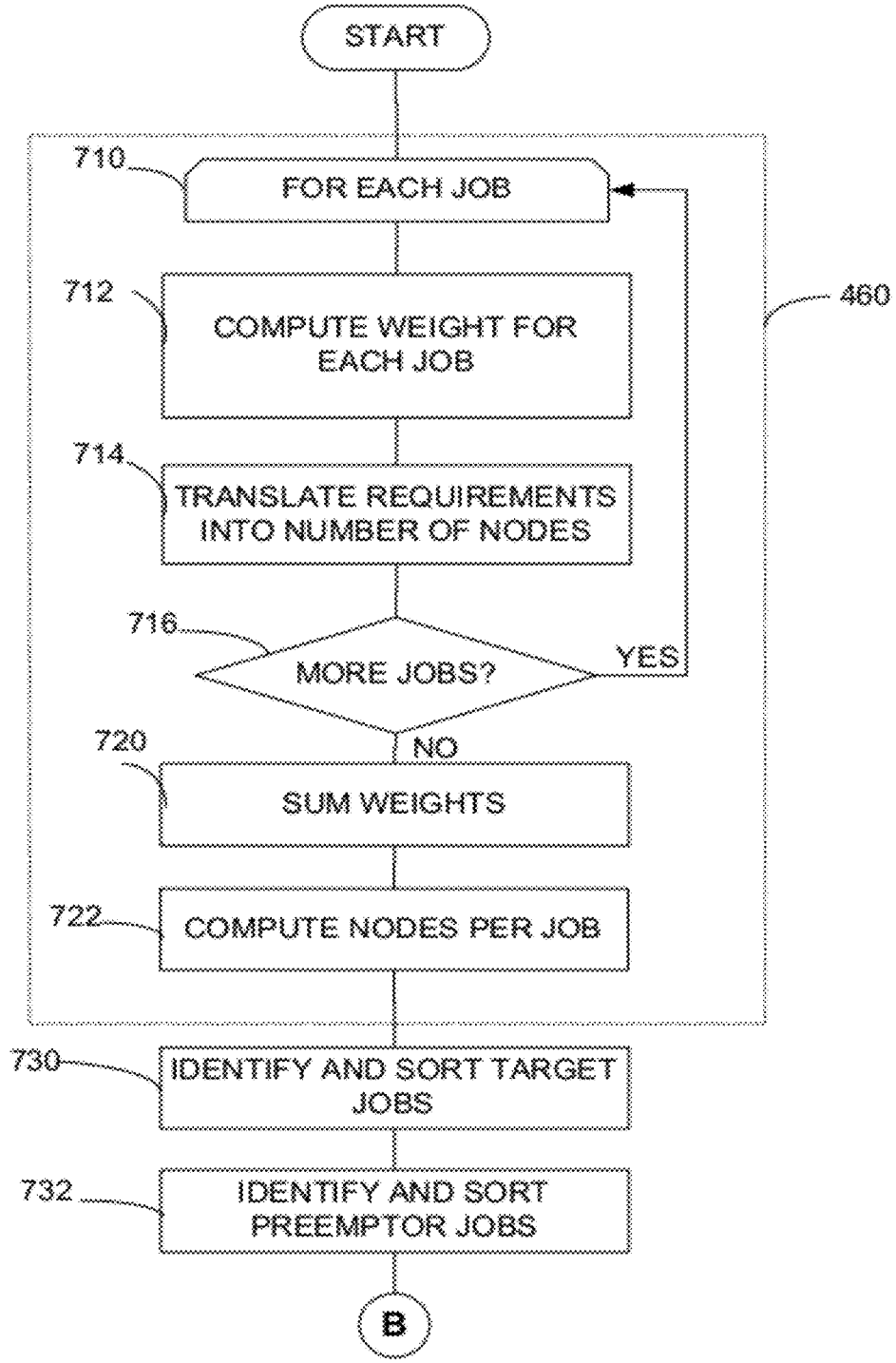
FIGS. 7A and 7B, when connected at the points labeled B, form a flow chart of a process of operating a scheduler for a cluster in a second mode in which resources are allocated to executing jobs in accordance with a desired distribution.
Figure 7B:
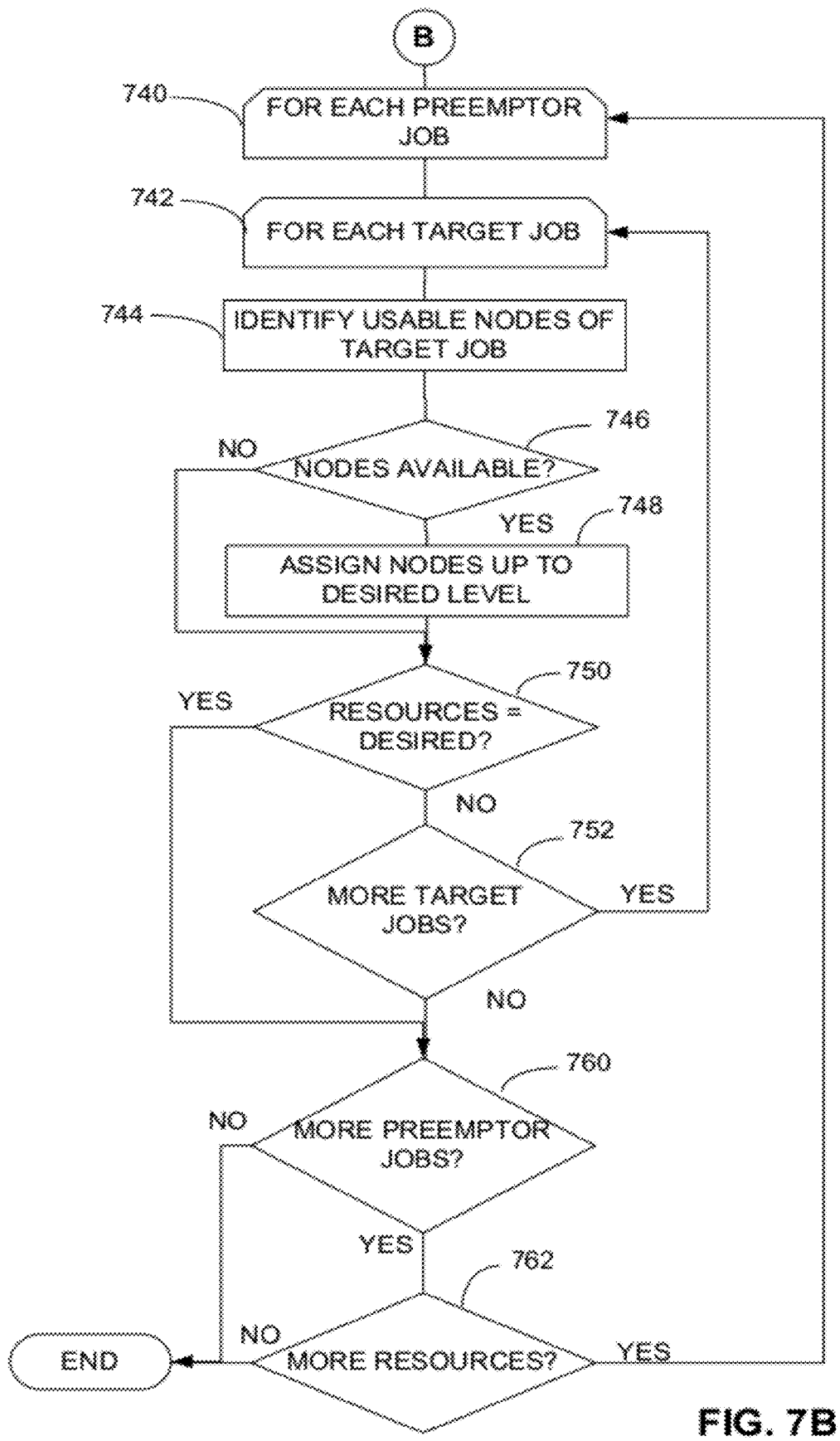

Regardless of the specific processing steps, as indicated in FIG. 4, once resources have been allocated to as many jobs as possible, processing within mode 401 may end. Processing within mode 402, in which any resources above the designated minimums for each executing job are reallocated to achieve a desired resource distribution. FIGS. 7A and 7B provide an example of processing that may be implemented in mode 402.

That processing may begin with a computation of a desired distribution of computing resources, such as is indicated for sub-process 460. The processing in sub-process 460 may begin at loop-start 710. Processing within the loop beginning at loop-start 710 may be performed for all executing jobs, with each executing job considered in one iteration of the loop.

At block 712, a weight for the job being processed in computed. The weight computed at block 712 may be dependent on a priority assigned to the job. Such a weight may result in higher priority jobs being allocated a greater proportion of the resources than lower priority jobs. Such a weight may be computed in any suitable way. In some embodiments, the weighting may be non-linear. A specific example, each job may have an associated priority, which may be assigned as described above in connection with the discussion of FIG. 2 or in any other suitable way. A non-linear mapping may be achieved, for example, by using the priority associated with a job as an exponent. In such an embodiment, the weight assigned to a job may be computed as a value, BalancedPriorityWeighting$^{PRIORITY}$. In some embodiments, the factor BalancedPriorityWeighting may be a parameter of operation of a computing cluster that may be assigned by a network administrator. The value of BalancedPriorityWeighting may be selected by the cluster administrator to control the degree to which higher priority jobs are favored in the allocation of resources. For example, a cluster administrator may assign a low value, such as one to BalancedPriorityWeighting to provide no bias. For a medium amount of bias, the parameter BalancedPriorityWeighting may be assigned a value such as 2. To achieve a high bias, the parameter BalancedPriorityWeighting may be assigned a higher value, such as 10. Of course, other values may be used. Setting BalancedPriorityWeighting to 0 (meaning basically ignore priority) or infinite (meaning basically give high priority jobs everything they want before looking at lower priority jobs) may be useful.

In the embodiment illustrated, the value of the parameter PRIORITY may take on one of a discrete number of values, such as 0, 1, 2, 3, 4. Though, any suitable number of priority levels may be possible. In some embodiments, it may be desirable to allow a priority for a job to take on more values than there are levels used in computing the weighting at block 712. In such a scenario, a mapping may be used to map a priority value assigned to an executing job to one of the priority levels used in computing a weight at block 712. Though, even in this scenario, the priority values may be used to compute the weight of a job.

Regardless of the manner in which a weight is computed at block 712, once the weight is determined, processing may proceed to block 714. At block 714, the resource requirements for the job may be translated into a common format. The processing at block 714 may be omitted in embodiments in which resource requirements for all executing jobs are expressed in the same manner. However, in embodiments in which jobs may have associated resource requirements specified in different ways, processing at block 714 may map each resource requirements into a common format. For example, in some embodiments, a processing node may be regarded as the smallest schedulable unit of processing resources. Accordingly, at block 714 resource requirements of the job may be mapped to a number of nodes. For example, resource requirements specified as sockets or computers may be mapped to a number of nodes.

The processing may then branch at decision block 716. If more executing jobs remain to be processed, processing may loop from decision block 716 back to loop-start 710 where the next executing job is processed. Conversely, once all of the executing jobs have been processed, processing may proceed to block 720. At block 720, a sum may be computed from all of the weights computed at block 712 for the jobs individually.

At block 722 a number of nodes may be computed for each job. The number of nodes for each job may be computed based on the weight for the job computed at block 712 and the sum of the weights computed for all jobs computed at block 720. In some embodiments, the ratio between the weight for a job and the sum over all weights may indicate a fraction of the jobs available for allocation that are assigned to a job.

In processing at block 722, the nodes available for allocation may constitute a "grow pool." The grow pool may contain nodes that are not currently allocated for execution of any job. In addition, the grow pool may contain nodes allocated to executing jobs that are in excess of the respective minimum resource requirements for the executing job.

The number of nodes in the grow pool, in combination with the ratio weights for the jobs, results in a number of nodes to be allocated to each job in addition to the respective designated minimums for the job. This value for each job may be computed by multiplying the number of jobs in the grow pool by the ratio of the weight for the job to the sum of all weights. These computed numbers may be adjusted in one or more ways to yield the desired distribution of nodes to executing jobs. In scenarios in which the computation yields a number of nodes for a job that is not an integer, any suitable rounding techniques may be used. Though, the rounding should be done in a way that ensures that the total number of nodes allocated for all executing jobs does not exceed the number of nodes in the grow pool. As another adjustment, if the computed number of nodes for any job exceeds the designated maximum for that job, the desired allocation to that job may be reduced to the designated maximum.

Following any adjustments, the computed number of nodes for each of the executing jobs defines a desired distribution of resources, as described above in connection with sub-process 460 (FIG. 4), above. Once the desired allocation is determined, processing may proceed to block 730.

At block 730, target jobs may be identified and sorted. Processing at block 730 may be similar to that performed at block 614 (FIG. 6) in which target jobs are sorted with lowest priority and newest jobs first. Though, in block 730, the target jobs are those which have a current allocation of processing resources that exceed the desired allocation for the job.

At block 732, preemptor jobs are identified and sorted. The preemptor jobs sorted at block 732 may be those executing jobs currently assigned resources below their desired allocation. Sorting at block 732 may entail sorting the jobs by priority, with highest priority jobs ordered to be processed first. Though, other sort criteria may alternatively or additionally be used. For example, preemptor jobs may be sorted to order older jobs first. Regardless of the manner in which the preemptor and target jobs are sorted, processing may proceed to loop-start 740. Loop-start 740 is the start of a loop of processing performed over the preemptor jobs. In each iteration through the loop, a preemptor job is processed. The specific job processed in each iteration is selected based on the ordering established in block 732.

Embedded within the loop that starts at loop-start 740 is a second loop that starts at loop-start 742. The loop that begins at loop-start 742 loops over each target job, with a selected target job being processed in each iteration of the loop. The target jobs are selected in the order established at block 730.

Accordingly, when processing reaches block 744, a preemptor and a target job have been selected. Processing at block 744 identifies whether any of the nodes in the target job are suitable for deallocation from the target job such that they can be allocated to the preemptor job. Any suitable criteria may be applied at block 744 to determine whether a node of a target job may be de-allocated and reallocated. As one example, a node that is not suited for executing any task of the selected preemptor job may not be selected at block 744 for deallocation. As another example, nodes executing a task in a target job that cannot be rescheduled may not be selected at block 744 for reallocation to the preemptor job. As another example, nodes, if de-allocated from the target job, would decrease the resources allocated to the target job below the desired allocation for that target job also may not be de-allocated.

Regardless of the manner in which nodes suitable for reallocation are identified at block 744, the process may proceed to decision block 746. At decision block 746, the process may branch depending on whether nodes were identified for re-allocation at block 744. If nodes are available for re-allocation, processing may proceed to block 748. At block 748, nodes identified as suitable for re-allocation may be allocated to the preemptor job. However, the re-allocation that is performed at block 748 may be limited so as not to decrease the resources allocated to the target job below the desired allocation for that job or to increase the resources allocated to the preemptor job above the desired allocation for that job.

On completion of the processing at block 748, processing may proceed to decision block 750. Processing may also arrive at decision block 750 from decision block 746. If the result of processing at block 744 did not result in identifying nodes available for reallocation, processing may branch from decision block 746 to decision block 750. Regardless of the manner in which processing reach is decision block 750, the process may again branch at decision block 750 based on whether the preemptor job has received an allocation of processing resources to bring the resources allocated to the preemptor job to the desired allocation. If not, processing branches from decision block 750 to decision block 752.

At decision block 752, the process may loop back to loop-start 742 where the next target job is selected for processing. Processing of the next target job may result in further identification of target jobs that usable by the preemptor job and available for reassignment to the preemptor job. Accordingly, processing may continue to loop until processing reaches decision block 752 and there are no further target jobs to consider or processing reaches decision block 750 and the preemptor job has received an allocation of resources equally the desired allocation for that job. In either event, processing may proceed to decision block 760.

At decision block 760, the process may again branch depending on whether additional preemptor jobs remain for processing. If all preemptor jobs have been processed, the process illustrated in FIG. 7B may end. Conversely, if more preemptor jobs remain to be processed, the process may continue to decision block 762. At decision block 762, the process may again branch, depending on whether there are any remaining target jobs that have been allocated resources above the desired allocation for that job. If so, the processing may loop back to loop-start 740 where a further preemptor job may be selected for processing. In this way, the process illustrated in FIG. 7B may be performed iteratively until all preemptor jobs have received an allocation consistent with the computed desired allocation or no further nodes are identified for re-allocation in accordance with the desired distribution. If no further resources exist for reallocation, the process may branch from decision block 762 to the termination point of the process.

Though FIG. 7B illustrates that processing terminates, the termination in FIG. 7B illustrates only that an iteration in mode 402 (FIG. 4) has been completed. As illustrated in FIG. 4, scheduler 10 may repetitively perform processing in modes 401 and 402. When processing in mode 401 is repeated additional ready jobs may receive an allocation of computing resources, if possible, and execution of those jobs may be initiated. When mode 402 is repeated, a desired allocation of computing resources above the designated minimums for the executing jobs may be computed. A reallocation of allocated nodes may then be performed in an attempt to achieve the desired allocation. In this way, a large number of jobs may be scheduled for execution with low latency, which may provide a desirable performance property, particularly in a service oriented architecture. Additionally, the allocation of computing resources results in balanced distribution of computing resources such that higher priority jobs may receive a preferential allocation to further improve the experience of clients waiting for jobs to be completed.

Figure 8:
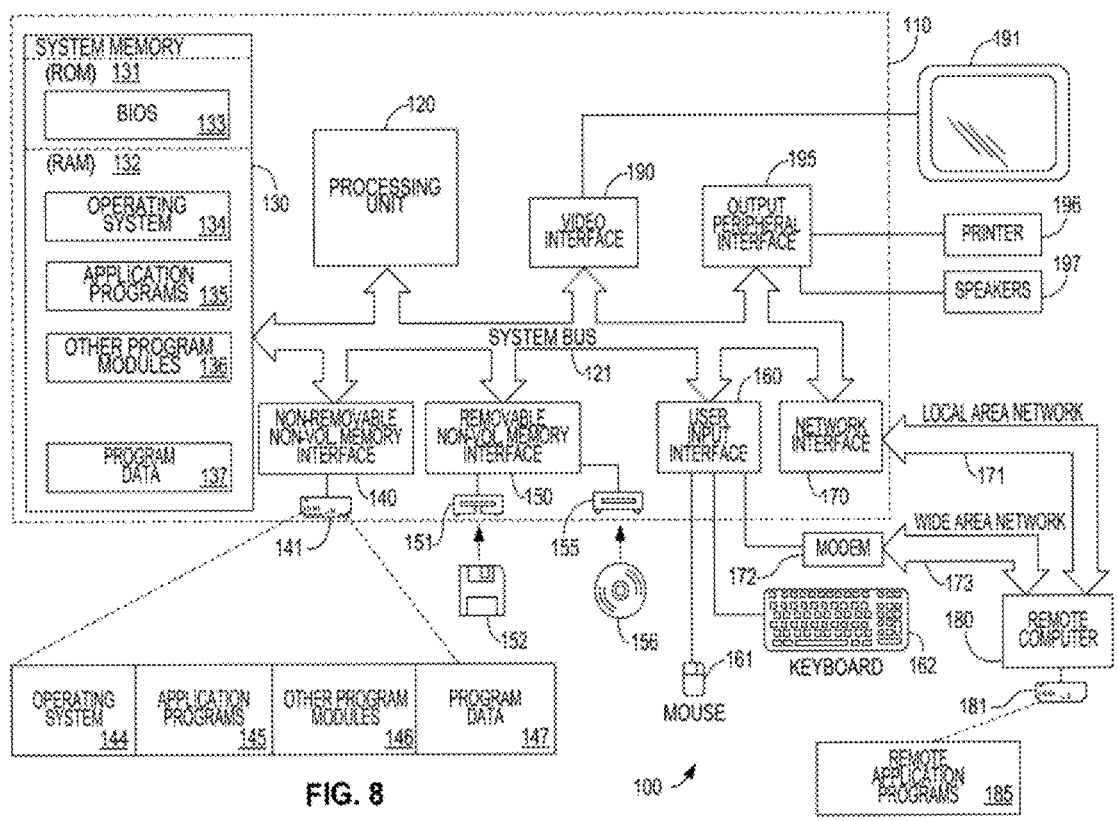
FIG. 8 is a schematic illustration of a computing environment that may be employed in some embodiments of the invention.

FIG. 8 illustrates an example of a suitable computing system environment 100 that may be used in some embodiments of the invention. A client, scheduler or computing resource may have a form as illustrated in FIG. 8. Though, it should be appreciated that the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may provide for execution of computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 8 illustrates operating system 134, application programs 135, other program modules 136, and program data 137.

The computer 110 may also include other removable/non-removable, volatile/nonvolatile computer storage media. By way of example only, FIG. 8 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 8, provide storage of computer readable instructions, data structures, program modules and other data for the computer 110. In FIG. 8, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 8. The logical connections depicted in FIG. 8 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 8 illustrates remote application programs 185 as residing on memory device 181. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, it was described above that scheduler 10 makes decisions relating to whether a node is suitable for allocation to a particular job or deallocation from a particular job. It should be appreciated that these decisions may reflect operating policy of a cluster administrator or other party rather than physical possibility or impossibility. A node that, if allocated to a job would trigger use of substantially more resources, such as network bandwidth or compute time, may be regarded as unsuitable for assignment to that node based on a policy. Likewise, a node executing a task that could be rescheduled, but with a cascading effect of requiring multiple other tasks to also be rescheduled for execution, may be regarded as unsuitable for deallocation.

As another example, scheduling decisions based on minimum, maximum, and priority as the main determinants were described. It should be appreciated that other determinants may be used, such a Load (which change over time), instead of or in addition to these determinants.

As yet another example, a variation of the exemplary embodiment of FIG. 5 may be formed by canceling an executing job of lower priority than a ready job of higher priority to the higher priority ready job to receive an allocation, of its minimum resource requirements.

Also, limits may be imposed on the processing described above. For example, nodes may not be de-allocated if doing so would result in canceling a task that was previously canceled or was previously canceled as part of a prior reallocation of computing resources.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a scheduler within a computing cluster to schedule a plurality of jobs for concurrent execution on resources of the computing cluster, the method comprising:
   with at least one processor:
   receiving for each of a plurality of jobs, a request for a minimum number of computing resources;
   determining that an executing job of the plurality of jobs is using more than the minimum number of computing resources for that job which are usable by one of the plurality of jobs which has not yet been allocated computing resources;
   de-allocating an allocated resource from the executing job allocated in excess of the minimum number of computing resources of the executing job, in an attempt to meet the minimum number of computing resources of the one of the plurality of jobs which has not yet been allocated computing resources;
   allocating the de-allocated resource to the one of the plurality of jobs;
   computing for each of the plurality of jobs a respective desired allocation of the resources;
   adjusting resources among the plurality of jobs by:
     identifying a first job of the plurality of jobs using less than the respective desired allocation of resources;
     identifying a second job of the plurality of jobs using more than the respective desired allocation of resources;
   de-allocating a resource from the second job and allocating the de-allocated resource to the first job, wherein:
   identifying a second job of the plurality of jobs more than the respective desired allocation of resources comprises identifying as the second job a job using a resource usable by the first job, wherein identifying the second job comprises evaluating the plurality of jobs in reverse order of priority, with lowest priority jobs being evaluated first; and
   de-allocating the resource from the second job comprises de-allocating the resource usable by the first job.

2. The method of claim 1, further comprising:
   adding to the plurality of jobs a ready job from a queue of ready jobs, the ready job comprising a minimum resource requirement associated therewith, and the adding comprising assigning to the ready job a number of resources based on the minimum resource requirement.

3. The method of claim 2 further comprising, following adding the ready job to the plurality of jobs, repeating the act of adjusting resources among the plurality of jobs.

4. The method of claim 1, wherein the method comprises balancing resources by repeatedly performing the act of adjusting resources among the plurality of resources until:
   no further job is identified that is using less than the respective desired allocation of resources is identified; or
   no further job is identified that is using more than the respective desired allocation of resources and that is using a resource usable by a job using less than the respective desired allocation of resources.

5. The method of claim 1 wherein:
   identifying the first job comprises evaluating the plurality of jobs in order of priority, with highest priority jobs being evaluated first.

6. The method of claim 1, wherein:
   the plurality of jobs comprises executing jobs;
   the method further comprises, initiating execution of each of the plurality of jobs by assigning to each of a plurality of selected jobs in a ready queue a number of resources determined based on a minimum requirement associated of the selected job, the selected jobs being selected in order of priority and length of time in the ready queue.

7. A computer storage memory comprising computer-executable instructions that, when executed by a processor, perform a method of scheduling resources in a computing cluster, the method comprising:
   in a first mode:
     allocating resources to at least one ready job in a ready queue, wherein the at least one ready job has not yet been allocated resources, the resources being allocated to each of the at least one ready job based on a minimum resource requirement specified for the ready job including in order to meet the minimum resource requirement of the at least one ready job, de-allocating an allocated resource from another job allocated in excess of the minimum resource requirement of the another job, and, allocating the de-allocated resource to the at least one ready job;
   in a second mode:
     determining a desired respective allocation of resources for each of the plurality of executing jobs; and
     adjusting resource usage by de-allocating a resource from at least one job using more than the respective desired allocation of resources and allocating the de-allocated resource to a job using less than the respective desired allocation of resources, wherein adjusting the resource usage comprises processing executing jobs in inverse order of priority and inverse order of length of time already executing, wherein determining a desired respective allocation of resources for each of the plurality of resources comprises:
       determining a number of resources available for allocation among the plurality of executing jobs;
       determining a weight for each of the plurality of executing jobs;
       computing a value representing the aggregate of the weights of the plurality of executing jobs;
     computing an amount of resources for each of the plurality of executing jobs as a fraction of the resources available for allocation, the fraction being based on the ratio of the weight of the executing job to the value representing the aggregate weights.

8. The computer storage memory of claim 7, wherein determining a weight for each of the plurality of executing jobs comprises evaluating a non-linear function of respective priorities assigned to the plurality of executing jobs.

9. The computer storage memory of claim 7, wherein determining a number of resources available for allocation comprises summing:
   an amount of resources that are not assigned to any executing job; and
   an amount of resources assigned to executing jobs in excess of the minimum resource requirement specified for the respective executing jobs.

10. The computer storage memory of claim 7, wherein processing executing jobs comprises:
    identifying whether the job being processed is using a resource usable by a job using less than the respective desired allocation of resources;
    when a usable resource is identified, de-allocating the identified resource from the job being processed; and
    allocating the de-allocated resource to a job using less than the respective desired allocation of resources.

11. The computer storage memory of claim 10, wherein the first mode comprises allocating resources to each ready job in the queue for which resources are available.

12. The computer storage memory of claim 7, wherein the first mode and the second mode are performed repetitively.

13. The computer storage memory of claim 12, wherein a repetition of the first mode is performed when a job has been submitted and is ready for execution but has not yet been allocated resources.

14. The computer storage memory of claim 12, wherein a repetition of the second mode is performed in response to events during execution of jobs.

15. A system comprising:
a plurality of computing nodes providing computing resources, at least one of the computing nodes comprising a processor;
a scheduler, the scheduler comprising:
a ready queue holding jobs received from a plurality of clients;
an allocator, executing on at least one processor, operating in a first mode comprising:
allocating available computing resources to ready jobs in a ready queue, wherein ready jobs have not yet been allocated resources, the resources being allocated to each of the ready jobs based on a minimum resource requirement specified for the ready job, the available computing resources comprising un-allocated resources and resources allocated and used by executing jobs in excess of respective minimum requirements for the executing jobs,
the allocator further operating in a second mode comprising:
determining a desired respective allocation of resources for each of the plurality of executing jobs; and
adjusting resource usage by identifying at least one job using more than the respective desired allocation of resources by evaluating the plurality of executing jobs in reverse order of priority, with lowest priority jobs being evaluated first, de-allocating a resource from the at least one job using more than the respective desired allocation of resources and allocating the de-allocated resource to a job using less than the respective desired allocation of resources, wherein the second mode is initiated in response to an event, the event comprising at least a ready job being assigned resources and an executing job freeing up resources upon termination.

16. The system of claim 15, wherein:
the first mode comprises identifying executing jobs having assigned resources that are in excess of a respective minimum for the job and that are usable by a job in the ready queue.

17. The system of claim 15, wherein the first mode comprises assigning resources based on a respective minimum associated with all ready jobs for which the respective minimum resources are available.

18. The system of claim 17, wherein assigning resources based on the respective minimum associated with all ready jobs for which the respective minimum resources are available comprises processing the ready jobs in the ready queue primarily in order of priority and secondarily based on time in the ready queue.

19. The system of claim 15, wherein the first mode and the second mode are performed repetitively.

20. The system of claim 19, wherein a repetition of the first mode is performed when a job has been submitted and is ready for execution but has not yet been allocated resources, and, a repetition of the second mode is performed in response to events during execution of jobs.

* * * * *